United States Patent Office 2,716,616
Patented Aug. 30, 1955

2,716,616

TREATED BITUMINOUS AND AGGREGATE COMPOSITIONS

John L. Rendall and Donald R. Husted, St. Paul, Minn., assignors to Minnesota Mining and Manufacturing Company, St. Paul, Minn., a corporation of Delaware No Drawing. Application May 23, 1949,
Serial No. 94,933

4 Claims. (Cl. 106—273)

Our invention relates to improvements in the bituminous compositions used to bind together mineral aggregates or solids, and in the solids themselves, so as to provide for or produce strongly unified mixtures or compositions involving bituminous materials and solids.

It is well known that, when certain materials (commonly called asphalt additives) are mixed with bituminous matter in minor proportions, the adhesion of the latter to mineral aggregates is improved, thereby resulting in more coherent mixtures. The improved adhesion of the bituminous material to the mineral aggregates, as is obvious, results in more durable road surfaces, and such like.

We have found that we can improve the bond between bituminous compositions, on the one hand, and mineral aggregates, such as ordinary rocks, or asbestos, or such like, on the other hand, by the use of a particular class of chemical materials which, so far as we known, never have been employed or suggested for such use. Our preferred additive materials all have the following general formula:

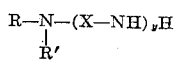

where R is a hydrocarbon group, R' is hydrogen or a hydrocarbon group, X is any alkylene group and $y$ is a whole number. Some specific examples of our additives, of the type just specified are:

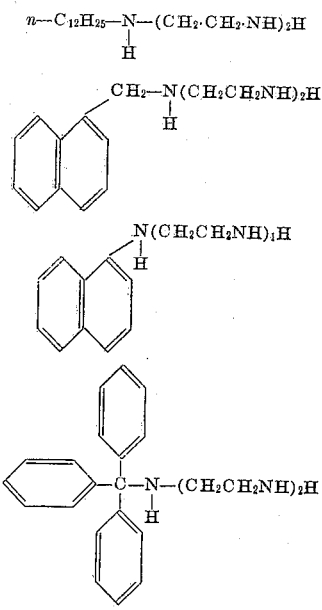

It will be seen that the foregoing specific compounds illustrate cases where the R group (which is a hydrocarbon group) may be either a straight-chain aliphatic group, as in the case of the first specific compound mentioned, or it may be an aromatic group, of many various types, as illustrated by the other three compounds shown. R may also consist of various other hydrocarbon radicals, e. g. branched-chain or olefinic groups, or various mixtures of any of the hydrocarbon groups. It will be noted that R' is illustrated by hydrogen in each of the above examples, but it may be a monovalent hydrocarbon group, where desired. In the compounds given, $y$ is illustrated as being either 1 or 2, although it may be 3 or 4, or other whole numbers.

This brief reference at this point to the types of compounds which we have found useful for our purposes is meant simply to be illustrative, so that their general nature may be better understood at the outset.

While some of the compounds of the type above illustrated, which we have prepared and used as asphalt additives, are new, yet various of our additive compounds, of the type shown by the general formula above illustrated, have heretofore been known and have been suggested for certain uses, such as detergents and flotation agents, but none of them, to our knowledge, have ever been suggested for use as asphalt additives; and even less was there any recognition heretofore, to our knowledge, that an improvement could made in the bonding of bituminous materials to rocks, sand, asbestos or such like by replacing previously suggested additives with compounds of the type employed by us, as above illustrated.

It will be seen that our additives, as above described, are N-substituted hydrocarbon alkylenepolyamines.

Heretofore others have suggested the use as additives for asphalt of certain mono-amines, such as $C_{18}H_{35}NH_2$, where the $C_{18}H_{35}$ radical is a straight-chain hydrocarbon. Such a compound differs widely in structure from our above illustrated additives, as will be apparent, in that it does not have any alkylene groups, and further does not have any alkylenepolyamino groups. Our additives have definite superiority over such prior additives, in their effectiveness during various conditions of practical use (such as when the aggregate is damp or wet) and also in providing (after the bituminous material has solidified or cured) a more strongly unified composition of bituminous material and aggregate, asbestos or such like.

An example of another prior suggestion of an asphalt additive is a compound where an acyl group is joined to a introgen-containing group, which latter includes alkylene groups and amino groups. An exmple of such a compound, heretofore suggested as an additive is

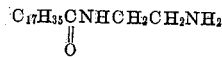

A compound containing an acyl group, in which the free valence is satisfied by an amino group, is, of course, an amide. Amides, as is well known, constitute a class of organic materials quite distinct in their behavier and characteristics from amines. The prior material, just mentioned above, being an amide, differs widely in its nature and characteristics from our compounds, above illustrated, as well as from other amines. We have found our additives to be much more effective in securing adherence, and in producing a strongly unified bond, between bituminous materials and aggregates, asbestos or the like.

As a variant of the prior additive just mentioned, it has also heretofore been suggested to produce the acid salt of that amide compound, such as:

RCONHCH₂CH₂NH₂·HOOCR'

Some other examples of prior art suggestions from literature in this general field are shown by the following U. S. patents:

Neelmeier et al., Patent No. 1,947,951
Muller, Patent No. 2,015,865
Sadtler, Patent No. 2,013,972
Dohse et al., Patent No. 2,191,295.

However, neither these patents nor any other prior art of which we are aware discloses or teaches the improvement in asphalt additives, and in bituminous compositions containing the same, which we have discovered, and disclose herein.

As distinguished from the prior known additive compositions, our additives (some of which may have been mentioned above) include:

a)
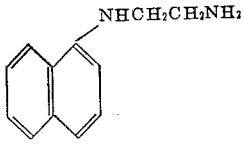
which is N-alpha-naphthyl ethylenediamine;

(b)
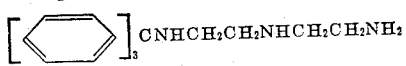
which is N-triphenylmethyl diethylenetriamine;

(c) The reaction product of diethylenetriamine with chlorinated paraffin oil, containing 5-30% chlorine, the diethylenetriamine being employed in such relative proportion as to replace a major portion of the chlorine and to yield a mono-substituted diethylenetriamine, i. e. a mono-substituted hydrocarbon alkylenepolyamine.

The paraffin oil which is employed, for example, may be a petroleum oil in the light lubricating oil range, e. g. predominantly in the $C_{14}$ to $C_{30}$ range, containing a preponderance, and preferably of the order of 85 percent or more, of non-sulfonatable hydrocarbons.

In place of the paraffin oil in the illustration just given, we may employ a kerosene (composed predominantly of $C_9$ and higher hydrocarbons) in which case we end up with an additive compound of lower molecular weight, but of approximately equal effectiveness as an additive.

PREPARATION OF ADDITIVE

The additive compound mentioned under paragraph (c), just above, may be prepared in the following manner:

Halogenation step

Preparation of Chlorinated Paraffin Oil. To one kilogram of a paraffinic oil, i. e. of the type identified in paragraph (c), is added chlorine, with agitation, maintaining the oil at a reaction temperature of 30 to 100° C., preferably about 70° C., until a weight increase of 333 grams has been effected. A condenser may be employed to prevent loss of the oil by entrainment in the escaping hydrogen chloride. Hydrogen chloride and unreacted chlorine are removed, at the end of the reaction, by passing air through the chlorinated oil at room temperature.

Condensation step

To 1633 grams of diethylenetriamine (which is 350% excess of that required by theory) is added 500 grams of the chlorinated oil, produced as described in the preceding paragraph. This addition is effected over a half-hour period, maintaining reflux temperatures and violent agitation. The reaction mixture is stirred and refluxed for an additional one-half hour and then cooled to room temperature. An amount of 310 grams of 50% aqueous NaOH is added, with agitation, and the agitation continued for one-half hour to remove HCl. Two layers are formed, the top layer including the alkylenepolyamine product and the bottom layer including NaCl, etc. The top layer is decanted and distilled under a vacuum of 12 mm. to a pot temperature of 150° C., the desired product remaining in the pot as a liquid residue.

An analysis of this product shows a nitrogen content of 12% and a chlorine content of 1.5%, and an average molecular weight of 350 (determined by the ebullioscopic method).

This analysis will be seen to correspond closely with that of the compound formed by condensation of equal molar quantities of diethylenetriamine and monochloroheptadecane, i. e. the condensation product

having a nitrogen content of 12.3% and a molecular weight of 341.

In the monochlorination of paraffins such as heptadecane, the chlorine atom may replace either a terminal or a non-terminal hydrogen atom. Since there are 30 non-terminal hydrogens as against only 6 terminal hydrogens in heptadecane, by far the larger proportion of the resulting monochloro molecules have the chlorine atom attached to a secondary or non-terminal carbon atom. This is particularly true since it is known that secondary hydrogens are more readily replaced by chlorine than are primary hydrogens; for example, see Groggins, "Unit Processes in Organic Synthesis," 1938, pages 165–166.

The product as produced by the method just described contains some impurities in addition to the essential N-substituted hydrocarbon alkylenepolyamines. These impurities include some unreacted hydrocarbons and some residual chlorine, for example. However, as an additive for bituminous materials, we have found that such products, without removal of the impurities, have an effectiveness as additives for bituminous compositions of the same order of magnitude as that of the corresponding pure N-substituted hydrocarbon alkylenepolyamines.

PREPARATION OF N-TRIPHENYLMETHYL DIETHYLENETRIAMINE

*(Which is disclosed above)*

A solution of 611.8 grams triphenylchloromethane (prepared by the method described in Organic Synthesis, vol. 23, pages 102–107; John Wiley and Sons—1943, and purified further by the method described on page 100, same reference) in approximately 600 ml. of benzene was added to 1,122 grams of diethylenetriamine with rapid stirring over a five minute period. (About five times as many mols of diethylenetriamine, as of triphenylchloromethane, are employed; that is, there is a 400 percent excess of the diethylenetriamine.) The mixture was then heated at reflux temperature, with stirring, for two hours. The reaction mixture was cooled to room temperature and more than sufficient aqueous caustic added to convert the amine hydrochlorides present to the corresponding free amines, NaCl and water. The supernatant benzene solution was decanted from the sludge and concentrated by distillation under vacuum to yield the desired viscous liquid product.

By directly parallel procedure N-triphenylmethyl ethylenediamine may be produced, in this case substituting ethylenediamine as a reactant in place of diethylenetriamine.

The N-alpha-naphthyl ethylenediamine, mentioned above as one of our additives, has been previously produced and employed for a non-analogous purpose: see Kirby et al., U. S. Patent No. 2,389,575.

Similarly,

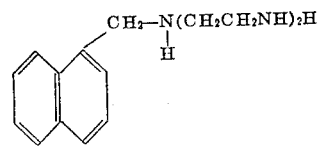

which is N-alpha-naphthylmethyl diethylenetriamine, which is mentioned earlier in this specification as one of our additives, may be prepared by a procedure directly analogous to that above given for preparing N-triphenylmethyl diethylenetriamine, by substituting alpha-naphthylmethyl chloride for triphenylchloromethane as a reactant for diethylenetriamine.

Another specific compound which we mention above as one of our additives is

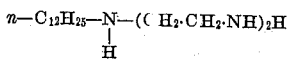

which is N-n-dodecyl diethylenetriamine. A further analogous compound, likewise contemplated as one of our additives, is

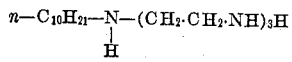

which is N-n-decyl triethylenetetramine. These two additive materials may be prepared according to prior known methods, such as disclosed in British patent No. 578,694, of American Cyanamid Company.

Examples of still other compounds, all within the general class stated above, which we contemplate as additives, are:

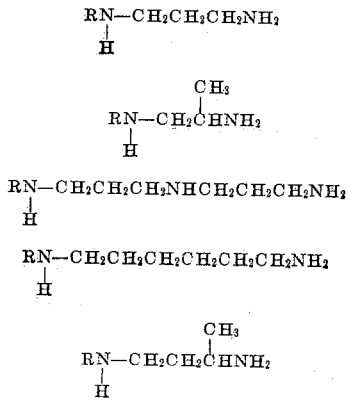

While not limited thereto, in general we prefer that the hydrocarbon group, i. e. the "R" group in our additive compounds, contain from 6 to 30 carbon atoms. Also, while not limited thereto, in our class of additive compounds, having the general formula

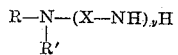

we prefer that $y$ be 1, 2, 3 or 4 and that $R'$ be hydrogen, although $y$ may be a higher whole number and $R'$ may be $CH_3$, $C_2H_5$ or other saturated, unsaturated, aromatic or cyclic group, e. g. having from 1 to 30 carbon atoms. Also, there may be attached to the hydrocarbon group or residue more than one alkylenepolyamine group (although this, in general, would tend to increase the cost of the additive). Further, although we have shown the R group attached to a terminal nitrogen, we likewise contemplate compounds where the R group is attached to a secondary nitrogen which may be present in an alkylenepolyamine.

Our N-substituted hydrocarbon alkylenepolyamine additives may vary from highly fluid liquids to solids, at ordinary room temperatures. Some of them are viscous or molasses-like in consistency. The specific compounds mentioned above, for use as our additives, are liquid materials (though some of them are rather viscous liquids), and this fluidity of these materials facilitates blending the same with bituminous compositions.

Our additives may be combined with bituminous compositions in different ways, the preferable method depending upon the individual circumstances. Where the additive compound employed is quite fluid and is to be added to a bituminous composition at the refinery, it can be added to the bituminous composition while the latter is in a heated, fluid state. It may similarly be added to a bituminous composition when the latter is in a heated, fluid state, as is often the case during road-building operations. Further, asphalts and other bituminous compositions are frequently rendered fluid in practice by employing hydrocarbon solvents, the resulting materials being referred to as "cut-backs." Our additives may conveniently be added to these "cut-back" compositions and, as with the heated, fluid bitumens, may be uniformly blended therewith with a minimum of agitation.

Various of our additive compounds in solution in water may conveniently be combined with bituminous compositions when the latter are prepared in the form of bituminous emulsions. In short, any suitable method of combining our additives with the bituminous compositions may be employed, and there is nothing critical about this procedure, except to effect thorough blending of the bituminous composition with the additive composition.

Where our additive compound is a solid at ordinary room temperatures, in many cases it may be desirable to dissolve it in a solvent and to blend the resulting solution with the bituminous composition; but where the additive material is a fluid at room temperatures and has a boiling point above the point at which a bituminous composition liquifies, ordinarily it may be added directly to such a bituminous composition and thoroughly blended and incorporated therein without other aids and with a minimum of agitation.

The bituminous material containing our additive then provides an effective composition for bonding aggregate particles, especially those having normally hydrophilic surfaces. The aggregate may be added to such bituminous composition, and the resulting bituminous-aggregate composition employed is a paving material; or, on the other hand, the bituminous material containing our additive may be applied to a road surface containing sand, gravel or other siliceous or mineral particles, thus serving to bond such particles together in a strongly unified road surface. Even where such particles of stone or sand are wet at the time of the application of the bituminous composition containing our additive, a good bond is effected between the bituminous material and the siliceous or mineral surfaces due to the effectiveness of our additives in the bituminous composition. The additive apparently functions to displace water from the surface of the aggregate and to effect a strong bond between the bituminous material and the aggregate surface.

In lieu of adding our additives to bituminous compositions, we have found that advantages of our invention can be secured to a significant extent by treating the mineral particles or aggregate with aqueous solutions of our additives, following which a strongly unified bond can more effectively be secured between such treated aggregate or particles and the bituminous composition.

Such additives may also be employed in bituminous compositions which are used to treat or bond asbestos particles or fibers; and/or the asbestos fibers, or such like, may themselves be treated with the additive.

Our additives are also useful in bituminous compositions employed to make roofing sheet material, where roofing granules, either of the natural or ceramically coated type, are deposited and coated on the exposed asphalt surface, and where the fibers of the roofing sheet material are bonded together by a bituminous material; and/or the additives may be used to treat the roofing granules or the fibrous base for the roofing sheet material, or both.

The effectiveness of our additives in promoting an attraction between mineral particles and bituminous materials may be further illustrated by the following. A film of oil on the top of water, as in harbors, is sometimes quite objectionable. By coating sand with quite minute amounts of our additives and then sprinkling the treated sand on the oil-coated surface of the water, the sand will sink, taking with it the oil.

The amount of our additive materials which should be employed, in relation to the bituminous material, varies somewhat in relation to the intended use. In general it is present in only small, though substantial, quantity in relation to the bituminous material. This quantity normally comes within the range of 0.05 to 2% of additive, by weight, to the bituminous material. Where the bituminous material is to be used in bonding an acidic aggregate, such as an ordinary siliceous rock, the additive may advantageously be present to the extent of about 0.2 to 0.3%, by weight, in relation to the asphalt or other bitumen. Where the bituminous composition is to be employed in bonding an aggregate of more basic or alkaline nature, a somewhat higher proportion of additive is ordinarily preferred, such as of the order of 0.8% of additive in relation to the bitumen. When the mineral aggregate is to be treated with our additives, and the bituminous material thereafter bonded to the treated aggregate, a smaller amount of additive in relation to the bituminous material may be employed, to coat wet or dry surfaces, for example 0.1 or 0.05% of additive in relation to the bituminous material where a siliceous or acidic aggregate is being treated, or a somewhat higher amount, e. g. 0.2 or 0.3%, where a more basic or alkaline aggregate or particles are being treated, and still get good contact between the bituminous material and the aggregate. However the higher amounts of additive, as mentioned above, e. g. about 0.2–0.8% of additive to bituminous material, is preferred to provide a strongly unified mixture (which resists stripping of the bituminous material from the aggregate) as a final product.

Hereinabove we have disclosed various specific materials as examples of our additive compositions and we have also illustrated the manner in which such additives may effectively be employed to secure bonds between bituminous materials, on the one hand, and siliceous or other mineral or aggregate particles, on the other hand, and to produce a more strongly unified bond therebetween. It will be understood that such disclosure is intended to illustrate our invention and not to limit it. All equivalents and variations within the scope of this disclosure and/or the appended claims are comprehended.

What we claim is:

1. A composition comprising a bituminous material as the dominant ingredient and having blended therewith from 0.05 to 2% of the condensation product of (1) a chlorinated liquid petroleum hydrocarbon, composed predominantly of $C_9$ to $C_{30}$ hydrocarbons, and containing 5–30% of combined chlorine, and (2) a liquid alkylenepolyamine; said condensation product being substantially free of chlorine and being composed mainly of mono-substituted hydrocarbon alkylenepolyamines containing a terminal primary amino ($—NH_2$) radical, said alkylenepolyamine groups being largely joined to non-terminal carbon atoms of the hydrocarbon molecules.

2. A composition according to claim 1 wherein the liquid petroleum hydrocarbon is composed predominantly of $C_{14}$ to $C_{30}$ hydrocarbons.

3. A composition comprising solid particles having normally hydrophilic surfaces, a bituminous material and, in relation to said bituminous material, a small but substantial proportion, of the order of 0.05 to 2%, of the condensation product of (1) a chlorinated liquid petroleum hydrocarbon, composed predominantly of $C_9$ to $C_{30}$ hydrocarbons, and containing 5–30% of combined chlorine, and (2) a liquid alkylenepolyamine; said condensation product being substantially free of chlorine and being composed mainly of mono-substituted hydrocarbon alkylenepolyamines containing a terminal primary amino ($—NH_2$) radical, said alkylenepolyamine groups being largely joined to non-terminal carbon atoms of the hydrocarbon molecules.

4. Solid particles having normally hydrophilic surfaces, said surfaces having applied thereto a coating of the condensation product of (1) a chlorinated liquid petroleum hydrocarbon, composed predominantly of $C_9$ to $C_{30}$ hyrocarbons, and containing 5–30% of combined chlorine, and (2) a liquid alkylenepolyamine; said condensation product being substantially free of chlorine and being composed mainly of mono-substituted hydrocarbon alkylenepolyamines containing a terminal primary amino ($—NH_2$) radical, said alkylenepolyamine groups being largely joined to non-terminal carbon atoms of the hydrocarbon molecules.

References Cited in the file of this patent

UNITED STATES PATENTS

| | | |
|---|---|---|
| 2,191,295 | Dohse et al. | Feb. 20, 1940 |
| 2,246,524 | Kyrides | June 24, 1941 |
| 2,534,713 | Hankins | Dec. 19, 1950 |